(12) United States Patent
Ripley et al.

(10) Patent No.: US 9,206,775 B2
(45) Date of Patent: Dec. 8, 2015

(54) FUEL PREHEATING USING ELECTRIC PUMP

(75) Inventors: David Lloyd Ripley, San Diego, CA (US); Behzad Hagshenas, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 589 days.

(21) Appl. No.: 13/542,311

(22) Filed: Jul. 5, 2012

(65) Prior Publication Data

US 2013/0192679 A1 Aug. 1, 2013

Related U.S. Application Data

(63) Continuation-in-part of application No. 13/363,472, filed on Feb. 1, 2012.

(51) Int. Cl.
| | |
|---|---|
| *F02M 37/00* | (2006.01) |
| *F02C 7/236* | (2006.01) |
| *B64D 37/34* | (2006.01) |
| *F02M 31/16* | (2006.01) |
| *B64D 41/00* | (2006.01) |

(52) U.S. Cl.
CPC ........... *F02M 37/0052* (2013.01); *B64D 37/34* (2013.01); *F02C 7/236* (2013.01); *F02M 31/166* (2013.01); *B64D 41/00* (2013.01); *F05D 2220/50* (2013.01); *F05D 2260/606* (2013.01); *F05D 2260/85* (2013.01); *Y02T 10/126* (2013.01); *Y02T 50/671* (2013.01); *Y10T 137/0324* (2015.04); *Y10T 137/86139* (2015.04)

(58) Field of Classification Search
CPC ... F02C 7/22–7/236; F02C 9/26; F02C 9/263; F04B 49/00; F04B 49/007; F04B 49/24; F05D 2220/50; F05D 2260/50; F02M 37/0052; F02M 31/166; B64D 37/34; Y10T 137/86139
USPC ...................... 60/39.281, 734, 736, 778, 236
See application file for complete search history.

(56) References Cited

U.S. PATENT DOCUMENTS

| | | | |
|---|---|---|---|
| 3,635,602 | A | 1/1972 | Grennan et al. |
| 3,650,643 | A | 3/1972 | Grennan et al. |
| 3,696,612 | A | 10/1972 | Berman |
| 4,085,585 | A | 4/1978 | Sharpe |

(Continued)

FOREIGN PATENT DOCUMENTS

| | | |
|---|---|---|
| EP | 2 093 400 A2 | 8/2009 |
| GB | 1 353 010 | 5/1974 |

(Continued)

OTHER PUBLICATIONS

International Search Report and Written Opinion, mailed Oct. 9, 2013.

*Primary Examiner* — Phutthiwat Wongwian
*Assistant Examiner* — Alain Chau
(74) *Attorney, Agent, or Firm* — Kinney & Lange, P.A.

(57) ABSTRACT

A fuel system for an auxiliary power unit includes a mechanical fuel pump, an electric fuel pump, and a controller. The mechanical fuel pump provides fuel flow to the auxiliary power unit and has an output dependent upon an operational speed of the auxiliary power unit. The electric fuel pump is located in flow series with the mechanical fuel pump. The controller causes the electric fuel pump to circulate and thereby warm fuel prior to start up of the auxiliary power unit.

17 Claims, 6 Drawing Sheets

(56) References Cited

U.S. PATENT DOCUMENTS

| | | | |
|---|---|---|---|
| 4,607,486 A | | 8/1986 | Cole |
| 4,729,218 A | | 3/1988 | Haselbauer et al. |
| 4,776,536 A | * | 10/1988 | Hudson et al. ............ 244/135 R |
| 4,915,593 A | | 4/1990 | Cygnor |
| 5,110,269 A | | 5/1992 | Fallon |
| 5,118,258 A | * | 6/1992 | Martin ............... 417/3 |
| 5,555,722 A | | 9/1996 | Mehr-Ayin et al. |
| 5,896,737 A | * | 4/1999 | Dyer ............... 60/773 |
| 6,651,441 B2 | | 11/2003 | Reuter et al. |
| 6,655,123 B2 | | 12/2003 | Blot-Carretero et al. |
| 6,817,343 B1 | * | 11/2004 | Greco et al. .......... 123/497 |
| 6,836,086 B1 | * | 12/2004 | Goldberg et al. ......... 318/141 |
| 6,996,970 B2 | | 2/2006 | Lorenz |
| 7,096,658 B2 | | 8/2006 | Wernberg et al. |
| 7,197,879 B2 | | 4/2007 | Buehman et al. |
| 7,216,487 B2 | | 5/2007 | Parsons |
| 7,237,535 B2 | * | 7/2007 | Eick et al. .......... 123/478 |
| 7,401,461 B2 | | 7/2008 | Eick et al. |
| 7,690,205 B2 | | 4/2010 | Delaloye et al. |
| 7,726,951 B2 | | 6/2010 | Jansen et al. |
| 7,762,080 B2 | | 7/2010 | Anson et al. |
| 7,845,177 B2 | | 12/2010 | Parsons |
| 7,895,819 B2 | | 3/2011 | Deldalle |
| 2005/0262824 A1 | * | 12/2005 | Yates et al. ............ 60/39.281 |
| 2007/0234739 A1 | | 10/2007 | Delaloye et al. |
| 2007/0284480 A1 | | 12/2007 | Atkey et al. |
| 2009/0077973 A1 | | 3/2009 | Hu et al. |
| 2009/0133676 A1 | | 5/2009 | Lepsch et al. |
| 2009/0199823 A1 | * | 8/2009 | Mahoney et al. ............ 123/497 |
| 2009/0211558 A1 | * | 8/2009 | Anson et al. ............ 123/497 |
| 2009/0271086 A1 | | 10/2009 | Morris et al. |
| 2010/0089025 A1 | | 4/2010 | Baker |
| 2010/0089026 A1 | | 4/2010 | Baker et al. |
| 2010/0126136 A1 | * | 5/2010 | Anson ............ 60/39.281 |
| 2010/0251692 A1 | | 10/2010 | Kinde, Sr. |
| 2010/0293919 A1 | * | 11/2010 | Poisson et al. ............ 60/39.281 |
| 2010/0300117 A1 | | 12/2010 | Moulebhar |
| 2011/0023444 A1 | * | 2/2011 | Veilleux, Jr. ............ 60/39.08 |
| 2011/0072823 A1 | | 3/2011 | Chen et al. |
| 2011/0202256 A1 | | 8/2011 | Sauve et al. |
| 2011/0243772 A1 | | 10/2011 | Leblanc et al. |
| 2011/0302927 A1 | | 12/2011 | Adami et al. |

FOREIGN PATENT DOCUMENTS

| | | |
|---|---|---|
| GB | 2 156 544 A | 10/1985 |
| GB | 2189296 A | 10/1987 |
| GB | 2 472 325 A | 2/2011 |
| WO | 2011070580 A1 | 6/2011 |

* cited by examiner

FIG. 1

"PRIOR ART"

FUEL PREHEATING USING ELECTRIC PUMP

CROSS-REFERENCE TO RELATED APPLICATION(S)

This application is a continuation in part of U.S. patent application Ser. No. 13/363,472, filed Feb. 1, 2012.

BACKGROUND

The present disclosure relates generally to auxiliary power units, and more particularly to fuel systems for providing fuel during starting of auxiliary power units.

Auxiliary power units (APUs) are used on aircraft for main engine starting, to provide in-flight engine restart assistance, and to supply power and compressed air for ground and in-flight operations. APUs are typically gas turbine engines that include a compression section, a combustion section, and a turbine section. The compression section draws in and compresses ambient air. The compressed air is mixed with fuel and ignited in the combustion section to produce high-energy combusted air. The combusted air is expanded in the turbine section, which rotates to drive the compression section and to provide additional power through an output shaft.

Typically, a gearbox is mounted to the output shaft of APUs for driving accessory generators and various pumps. Fuel is sent to the combustion section of an APU by one or more fuel pumps. Commonly used fuel pumps are high pressure, fixed volume, gear-driven type pumps that require mechanical rotation of the engine to produce fuel flow. During a start up operation of the APU, gear-driven pumps rotate at speeds much lower than normal operating speeds. At start up speeds, especially in the cold conditions of high altitude, gear-driven pumps cannot deliver fuel at a pressure and flow rate that provides for optimal ignition and burn off of fuel.

SUMMARY

A fuel system for an auxiliary power unit includes a mechanical fuel pump, an electric fuel pump, and a controller. The mechanical fuel pump provides fuel flow to the auxiliary power unit and has an output dependent upon an operational speed of the auxiliary power unit. The electric fuel pump is located in flow series with the mechanical fuel pump. The controller causes the electric fuel pump to circulate and thereby warm fuel prior to start up of the auxiliary power unit.

A fuel system for an auxiliary power unit includes a fuel supply conduit, a fuel metering unit, a mechanical gear driven pump, a mechanical boost pump, an electric pump, and a controller. The fuel supply conduit fluidly connects a fuel reservoir to a combustor. The fuel metering unit is located on the fuel supply conduit upstream of the combustor. The mechanical gear driven pump is located on the fuel supply conduit upstream of the fuel metering unit. The mechanical boost pump is located on the fuel supply conduit upstream of the mechanical gear driven pump. The electric pump is located on the fuel supply conduit upstream of the mechanical gear driven pump. The controller commands the electric pump to flow fuel through the mechanical gear driven pump to the fuel metering unit during starting of the auxiliary power unit.

A method for providing warmed fuel to an auxiliary power unit, the method includes commanding a valve to close and prevent fuel from flowing to the auxiliary power unit, providing power to an electric pump to circulate and thereby warm fuel prior to start up of the auxiliary power unit, and commanding the valve to open and allow fuel to flow into the auxiliary power unit.

DETAILED DESCRIPTION

Figure 1:
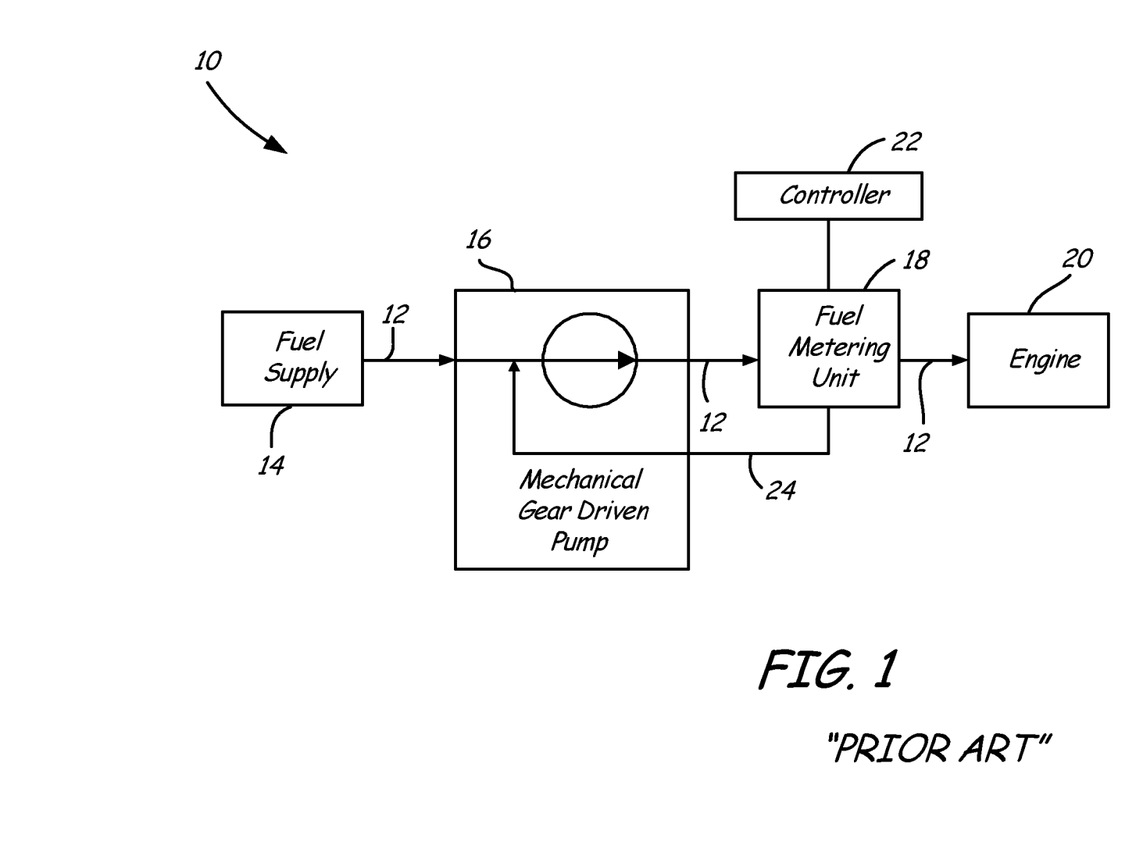
FIG. 1 is a schematic diagram of a fuel system in accordance with the prior art.

FIG. 1 is a schematic diagram of fuel system 10 for an auxiliary power unit (APU) in accordance with the prior art. Fuel system 10 includes fuel supply conduit 12, fuel supply 14, mechanical gear-driven pump 16, fuel metering unit 18, engine 20, controller 22, and fuel recirculation conduit 24. Fuel system 10 provides fuel from fuel supply 14 to engine 20 for combustion.

Fuel supply conduit 12 fluidly connects fuel supply 14 to a combustor in engine 20. More specifically, fuel supply conduit 12 connects fuel supply 14, mechanical gear-driven fuel pump 16, fuel metering unit 18, and engine 20 in flow series. Fuel metering unit 18 is located upstream of engine 20, mechanical gear-driven fuel pump 16 is located upstream of fuel metering unit 18, and fuel supply 14 is located upstream of mechanical gear-driven fuel pump 16 along fuel supply conduit 12. Controller 22 is electrically connected to fuel metering unit 18. Fuel recirculation conduit 24 fluidly connects fuel metering unit 18 to fuel supply conduit 12 near mechanical gear-driven fuel pump 16. More specifically, an inlet of fuel recirculation conduit 24 is connected to fuel metering unit 18 and an outlet of fuel recirculation conduit 24 is connected to fuel supply conduit 12 at a location downstream of fuel supply 14 and a location upstream of mechanical gear-driven fuel pump 16.

During use of engine 20, fuel flows from fuel supply 14 to engine 20 along fuel supply conduit 12. More specifically, fuel flows from fuel supply 14 along fuel supply conduit 12 to mechanical gear-driven fuel pump 16. Mechanical gear-driven fuel pump 16 pumps fuel along fuel supply conduit 12 to fuel metering unit 18. Fuel metering unit 18 receives a signal from controller 22 that indicates desired fuel flow to engine 20 based on operational need. Fuel metering unit 18 responds to the signal from controller 22 by then providing the desired fuel flow to engine 20 via fuel supply conduit 12. Fuel in excess of the amount required by engine 20 is sent from fuel metering unit 18 back to fuel supply conduit 12 along fuel recirculation conduit 24.

The fuel output of mechanical gear-driven fuel pump 16 is dependent on the operating speed of engine 20. When engine 20 is operating at normal, self-sustaining speeds (e.g.

50-100% of "maximum rated speed", i.e. maximum rotation speed at which engine will operate safely), mechanical gear-driven pump 16 is relatively efficient and provides more than enough fuel flow to fuel metering unit 18. At lower operating speeds (e.g. 1-10% of maximum rated speed), mechanical gear-driven pump 16 is far less efficient and may not provide sufficient fuel flow and pressure. As a result, a good quality fuel spray that is critical for successful high altitude ignition of engine 20 is more difficult to achieve. These problems are particularly pronounced during starting, when engine 20 operating speed is at or below about 6 or 7% of rated speed. It is, however, desirable to start engine 20 at a low rotational speed to facilitate ignition in the combustor. As a consequence, in order to achieve a fine spray at low speed more air must be mixed with the fuel. The additional air makes burning more difficult after light off.

The present disclosure is directed to improving the ability of fuel systems to deliver pre-warmed fuel in order to achieve a good quality fuel spray for fuel ignition during low speed engine starting. As described in detail below, the disclosure suggests adding an electric motor-driven fuel pump in series with the mechanical gear-driven pump. The electric fuel pump can be driven independent of engine operating speed to cause friction heating of fuel prior to engine start up. This pre-warmed fuel is then provided to the engine for ignition and start up.

Figure 2:
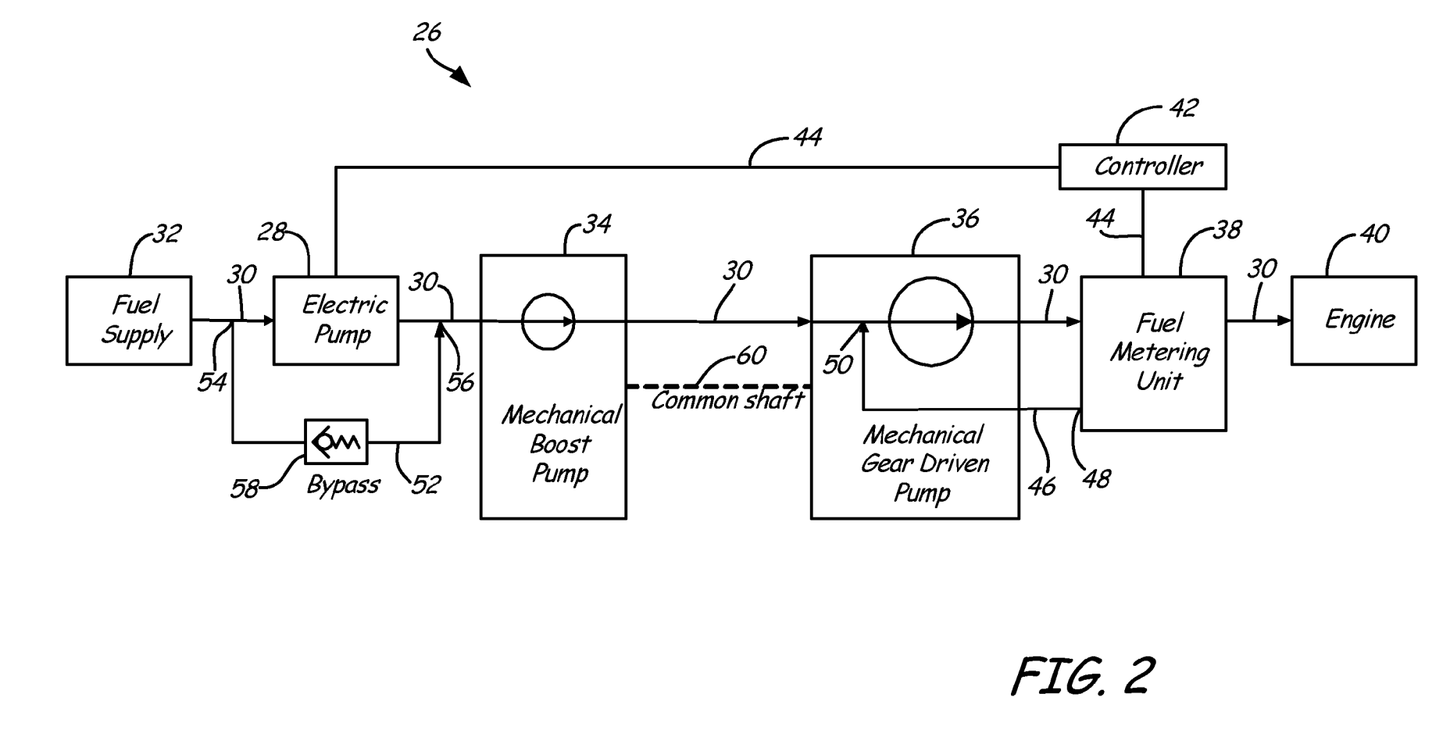
FIG. 2 is a schematic diagram of a first embodiment of a fuel system having an electric pump in accordance with the present disclosure.

FIG. 2 is a schematic diagram of fuel system 26 having electric fuel pump 28 for an APU in accordance with a first embodiment of the present disclosure. Fuel system 26 includes electric fuel pump 28, fuel supply conduit 30, fuel supply 32, mechanical boost fuel pump 34, mechanical gear-driven fuel pump 36, fuel metering unit 38, engine 40, controller 42, electrical connections 44, fuel recirculation conduit 46 having outlet 48 and inlet 50, fuel bypass conduit 52 having inlet 54 and outlet 56, bypass check valve 58, and rotational shaft 60. Fuel system 26 is presented in a simplified form and can additionally include filters, heat exchangers, and/or other conventional components known in the art. Inclusion of electric pump 28 allows fuel system 26 to provide more fuel at low engine 40 speed than would be otherwise possible.

Fuel supply conduit 30 fluidly connects fuel supply 32 to a combustor in engine 40. More specifically, fuel supply conduit 30 connects fuel supply 32, electric fuel pump 28, mechanical boost fuel pump 34, mechanical gear-driven fuel pump 36, fuel metering unit 38, and engine 40 in flow series. Along fuel supply conduit 30, fuel metering unit 38 is located upstream of engine 40, mechanical gear-driven fuel pump 36 is located upstream of fuel metering unit 38, mechanical boost fuel pump 34 is located upstream of mechanical gear-driven fuel pump 36, electric fuel pump 28 is located upstream of mechanical boost fuel pump 34, and fuel supply 32 is located upstream of electric fuel pump 28. Controller 42 is electrically connected to fuel metering unit 38 and to electric fuel pump 28 by electrical connections 44.

Fuel recirculation conduit 46 fluidly connects fuel metering unit 38 to fuel supply conduit 30 at or near mechanical gear-driven pump 36. More specifically, outlet 48 of fuel recirculation conduit 46 is connected to fuel metering unit 38 and inlet 50 of fuel recirculation conduit 46 is connected to fuel supply conduit 30 at a location downstream of mechanical boost fuel pump 34 and a location upstream of mechanical gear-driven fuel pump 36. Fuel bypass conduit 52 fluidly connects fuel supply conduit 30 upstream of electric fuel pump 28 to fuel supply conduit 30 downstream of electric fuel pump 28. More specifically, inlet 54 of fuel bypass conduit 52 is connected to fuel supply conduit 30 at a location downstream of fuel supply 32 and a location upstream of electric fuel pump 28, and outlet 56 of fuel bypass conduit 52 is connected to fuel supply conduit 30 at a location downstream of electric fuel pump 28 and a location upstream of mechanical boost fuel pump 34. Bypass check valve 58 is located on bypass fuel conduit 52. Rotational shaft 60 connects mechanical boost fuel pump 34 to mechanical gear-driven fuel pump 36.

For low speed operation of engine 40 (e.g. engine starting), controller 42 commands electric fuel pump 28 to operate via electrical connection 44. Fuel flows from fuel supply 32 along fuel supply conduit 30 to electric fuel pump 28, which pumps fuel along fuel supply conduit 30 to a combustor in engine 40 (through mechanical boost fuel pump 34, mechanical gear-driven fuel pump 36, and fuel metering unit 38). Since electric fuel pump 28 is driven independently of engine 40 (e.g. by a motor), fuel flow output of sufficient pressure and quantity is immediately available for engine 40 at low engine speed. For example, sufficient fuel for combustor ignition is anticipated at around 3% of max engine speed. In comparison, the prior art fuel system of FIG. 1 which relies solely on mechanical gear-driven fuel pump 16, will typically require a minimum of about 8% of engine max speed to develop sufficient fuel flow for combustor ignition. Accordingly, by inclusion of electric fuel pump 28 in fuel system 26, the window for combustor light-off (i.e. engine speed range in which ignition of fuel is possible) is lengthened from about 8-15% of max engine speed to about 3-15% of max engine speed by inclusion of electric fuel pump 28 in fuel system 26.

In addition to electric fuel pump 28, mechanical boost fuel pump 34 and mechanical gear-driven boost pump 36 pump fuel along fuel supply conduit 30 to engine 40. Electric fuel pump 28, mechanical boost fuel pump 34 and mechanical gear-driven fuel pump 36 are located in flow series. Fuel flows to mechanical boost fuel pump 34 from electric fuel pump 28 via fuel supply conduit 30. Mechanical boost fuel pump 34 pumps fuel along fuel supply conduit 30 to mechanical gear-driven fuel pump 36, which pumps fuel along fuel supply conduit 30 to fuel metering unit 38. Fuel metering unit 38 receives a signal from controller 42 that indicates proper fuel flow to engine 40 based on operational need. Fuel metering unit 38 responds to the command from controller 42 via electrical connection 44 by providing the proper fuel flow to engine 40 via fuel supply conduit 30. Fuel metering unit 38 can include a fuel metering valve, a differential pressure (delta P) valve, and/or a solenoid valve as known in the art. Fuel in excess of the amount required by engine 40 is sent from fuel metering unit 38 back to fuel supply conduit 30 along fuel recirculation conduit 46. More specifically, excess fuel exits fuel metering unit 38, flows through outlet 48 of fuel recirculation conduit 46 to inlet 50 and back into fuel supply conduit 30 at a location near an inlet of mechanical gear-driven fuel pump 36.

Fuel flow output of both mechanical boost fuel pump 34 and mechanical gear-driven fuel pump 36 is dependent upon and proportional to the operating speed of engine 40. Accordingly, mechanical boost fuel pump 34 and mechanical gear-driven fuel pump 36 are inefficient at low speeds and increasingly efficient as engine 40 speed increases. Once engine 40 reaches about 50% of max speed, mechanical boost fuel pump 34 and mechanical gear-driven fuel pump 36 provide more than enough fuel flow for the needs of engine 40 (i.e. engine is self-sustaining). Controller 42 then commands electric fuel pump 28 to cease operation, thereby extending the life of electric fuel pump 28 and saving energy. At or around the same time, bypass check valve 58 on bypass fuel conduit 52 will change from a closed state to an open state, thereby allowing fuel to flow along bypass fuel conduit 52 and around electric fuel pump 28.

In the depicted embodiment, bypass check valve 58 is a passive pressure valve that remains closed when the pressure differential across bypass check valve 58 is positive, (pressure in conduit 52 is greater than in conduit 54) and opens when a pressure differential across bypass check valve 58 is negative, (pressure in conduit 52 is less than in conduit 54) (e.g. when electric pump 28 is turned off). When the pressure differential across bypass check valve 58 causes bypass check valve 58 to open, fuel will flow from fuel supply 32 along fuel supply conduit 30 to inlet 54 of bypass fuel conduit 52, through bypass check valve 58, to outlet 56 of bypass fuel conduit 52, and back into fuel supply conduit 30 at a location downstream of electric pump 28 and upstream of mechanical boost fuel pump 34. In other words, fuel will bypass electric pump 28 when bypass check valve 58 is open. Fuel flow along bypass fuel conduit 52 can alternatively be managed by other types of valves (e.g. active valves controlled by controller 42 in coordination with other events in fuel system 26). In another embodiment, fuel flows along bypass fuel conduit 52 once electric fuel pump 28 is turned off and/or when fuel flow exceeds a flow capacity of the electric fuel pump 28. Fuel system 26 provides electric fuel pump 28 for supplementing fuel flow during low speed operation of engine 40. When electric fuel pump 28 is no longer needed (i.e. higher speed operation of engine 40), fuel bypasses electric fuel pump 28 and is pumped solely by mechanical boost fuel pump 34 and mechanical gear-driven pump 36.

Figure 3:
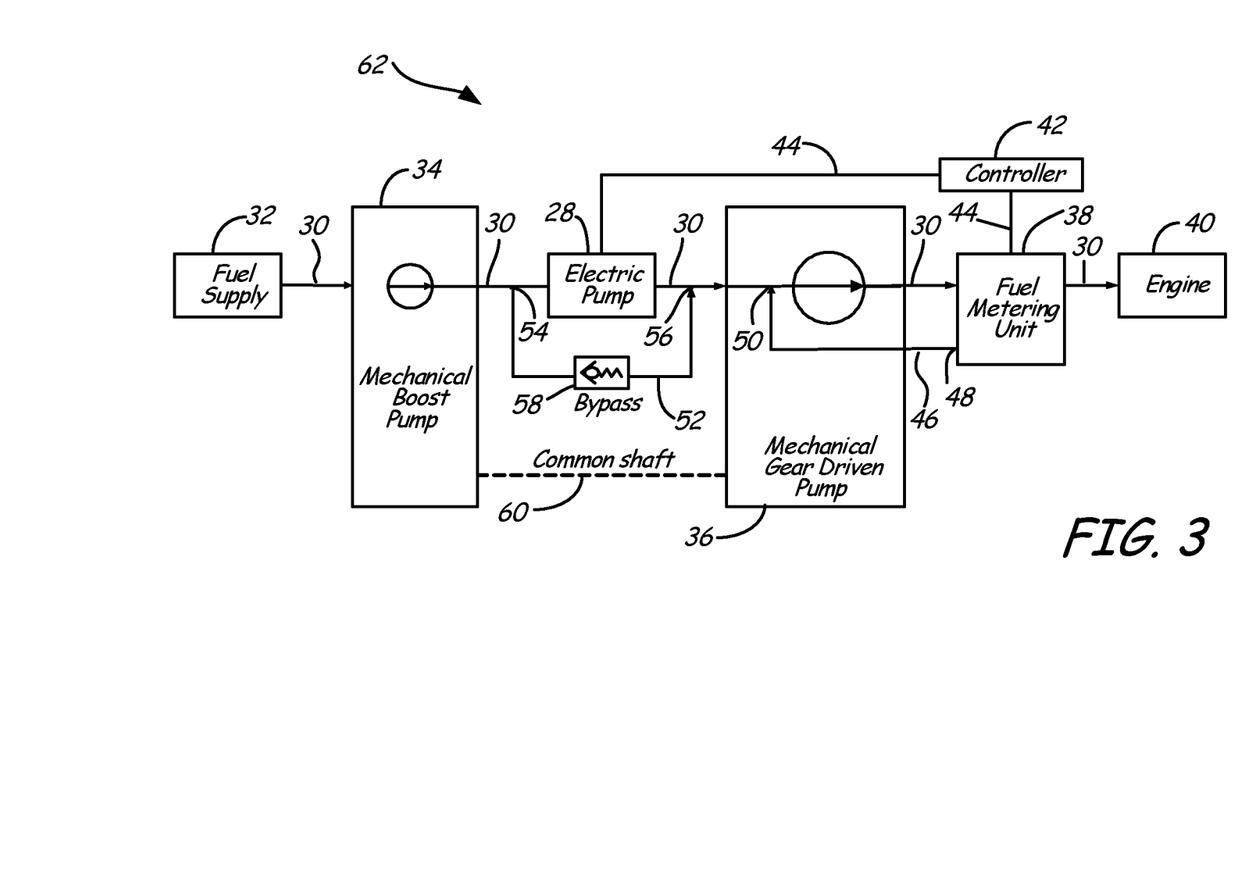
FIG. 3 is a schematic diagram of a second embodiment of a fuel system having an electric pump in accordance with the present disclosure.

FIG. 3 is a schematic diagram of fuel system 62 having electric fuel pump 28 for an APU in accordance with a second embodiment of the present disclosure. Fuel system 62 includes electric fuel pump 28, fuel supply conduit 30, fuel supply 32, mechanical boost fuel pump 34, mechanical gear-driven fuel pump 36, fuel metering unit 38, engine 40, controller 42, electrical connections 44, fuel recirculation conduit 46 having inlet 48 and outlet 50, fuel bypass conduit 52 having inlet 54 and outlet 56, bypass check valve 58, and rotational shaft 60. Fuel system 62 is presented in a simplified form and can additionally include filters, heat exchangers, and/or other conventional components known in the art. Inclusion of electric fuel pump 28 allows fuel system 62 to provide more fuel at low engine 40 speed than would be otherwise possible.

Fuel system 62 of FIG. 3 is similar to fuel system 26 of FIG. 2 and like numerals indicate like components. Fuel system 62 of FIG. 3 differs from fuel system 26 of FIG. 2 in that electric fuel pump 28 is located between mechanical boost fuel pump 34 and mechanical gear-driven fuel pump 36. Despite the alternative placement for electric fuel pump 28, fuel system 62 of FIG. 3 is operated in a manner similar to fuel system 26 of FIG. 2. The following discussion highlights the similarities and differences between fuel system 62 of FIG. 3 and fuel system 26 of FIG. 2.

In fuel system 62, fuel supply conduit 30 fluidly connects fuel supply 32 to a combustor in engine 40. More specifically, fuel supply conduit 30 connects fuel supply 32, mechanical boost fuel pump 34, electric fuel pump 28, mechanical gear-driven fuel pump 36, fuel metering unit 38, and engine 40 in flow series. Along fuel supply conduit 30, fuel metering unit 38 is located upstream of engine 40, mechanical gear-driven fuel pump 36 is located upstream of fuel metering unit 38, electric fuel pump 28 is located upstream of mechanical gear-driven fuel pump 36, mechanical boost fuel pump 34 is located upstream of electric fuel pump 28, and fuel supply 32 is located upstream of mechanical boost fuel pump 34. Controller 42 is electrically connected to fuel metering unit 38 and to electric fuel pump 28 by electrical connections 44.

Fuel recirculation conduit 46 fluidly connects fuel metering unit 38 to fuel supply conduit 30. More specifically, inlet 48 of fuel recirculation conduit 46 is connected to fuel metering unit 38 and outlet 50 of fuel recirculation conduit 46 is connected to fuel supply conduit 30 at a location downstream of electric fuel pump 28 and a location upstream of mechanical gear-driven fuel pump 36. Fuel bypass conduit 52 fluidly connects fuel supply conduit 30 upstream of electric fuel pump 28 to fuel supply conduit 30 downstream of electric fuel pump 28. More specifically, inlet 54 of fuel bypass conduit 52 is connected to fuel supply conduit 30 at a location downstream of mechanical boost fuel pump 34 and a location upstream of electric pump, and outlet 56 of fuel bypass conduit 52 is connected to fuel supply conduit 30 at a location downstream of electric fuel pump 28 and a location upstream of mechanical gear-driven fuel pump 36. Bypass check valve 58 is located on bypass fuel conduit 52. Rotational shaft 60 connects mechanical boost fuel pump 34 to mechanical gear-driven fuel pump 36.

Mechanical boost fuel pump 34, electric fuel pump 28, and mechanical gear-driven fuel pump 36 are located in flow series along fuel supply conduit 30. Fuel flows from fuel supply 32 along fuel supply conduit 30 to mechanical boost fuel pump 34. Fuel is pumped to electric fuel pump 28 from mechanical boost pump 34 through fuel supply conduit 30. Electric fuel pump 28 pumps fuel received from mechanical boost fuel pump 34 along fuel supply conduit 30 to mechanical gear-driven fuel pump 36, which pumps fuel along fuel supply conduit 30 to fuel metering unit 38. Fuel metering unit 38 receives a signal from controller 42 via electrical connection 44 that indicates proper fuel flow to engine 40 based on operational need. Fuel metering unit 38 responds to the command from controller 42 by providing the proper fuel flow to engine 40 via fuel supply conduit 30. Fuel metering unit 38 can include a fuel metering valve, a differential pressure (delta P) valve, and/or a solenoid valve as known in the art. Fuel in excess of the amount required by engine 40 is sent from fuel metering unit 38 back to fuel supply conduit 30 along fuel recirculation conduit 46. More specifically, excess fuel exits fuel metering unit 38, flows through inlet 48 of fuel recirculation conduit 46 to outlet 50 and back into fuel supply conduit 30 at a location downstream of electric fuel pump 28 and upstream of mechanical gear-driven fuel pump 36.

Fuel flow output of both mechanical boost fuel pump 34 and mechanical gear-driven fuel pump 36 is dependent upon and proportional to the operating speed of engine 40. Accordingly, mechanical boost fuel pump 34 and mechanical gear-driven fuel pump 36 are inefficient at low speeds and increasingly efficient as engine 40 speed increases. At low engine operating speed, controller 42 commands electric fuel pump 28 to operate via electrical connection 44 and supplement the inefficient pumping of mechanical boost fuel pump 34 and mechanical gear-driven fuel pump 36. Since electric fuel pump 28 is driven independently of engine 40 (e.g. by a motor), fuel flow output of sufficient pressure and quantity is immediately available for engine 40 at very low engine speed. Once engine 40 reaches about 50% of max speed, mechanical boost fuel pump 34 and mechanical gear-driven fuel pump 36 provide more than enough fuel flow for the needs of engine 40 (i.e. engine is self-sustaining). Controller 42 then commands electric fuel pump 28 to cease operation, thereby extending the life of electric fuel pump 28 and saving energy. At or around the same time, bypass check valve 58 on bypass fuel conduit 52 will change from a closed state to an open state, thereby allowing fuel to flow along bypass fuel conduit 52.

In the depicted embodiment, bypass check valve 58 is a passive pressure valve that remains closed when the pressure differential across bypass check valve 58 is positive, (pressure in conduit 52 is greater than in conduit 54) and opens when a pressure differential across bypass check valve 58 is negative, (pressure in conduit 52 is less than in conduit 54) (e.g. when electric pump 28 is turned off and not providing assist). When the pressure differential across bypass check valve 58 causes bypass check valve 58 to open, fuel will flow from mechanical boost fuel pump 34 along fuel supply conduit 30 to inlet 54 of bypass fuel conduit 52, through bypass check valve 58, to outlet 56 of bypass fuel conduit 52, and back into fuel supply conduit 30 at a location downstream of electric fuel pump 28 and upstream of mechanical gear-driven fuel pump 36. In other words, fuel will bypass electric fuel pump 28 when bypass check valve 58 is open. In another embodiment, fuel flows along bypass fuel conduit 52 once electric fuel pump 28 is turned off and/or when fuel flow exceeds a flow capacity of the electric fuel pump 28. Fuel system 26 provides electric fuel pump 28 for supplementing fuel flow during low speed operation of engine 40. When electric fuel pump 28 is no longer needed (i.e. higher speed operation of engine 40), fuel bypasses electric fuel pump 28 and is pumped solely by mechanical boost fuel pump 34 and mechanical gear-driven pump 36.

Figure 4:
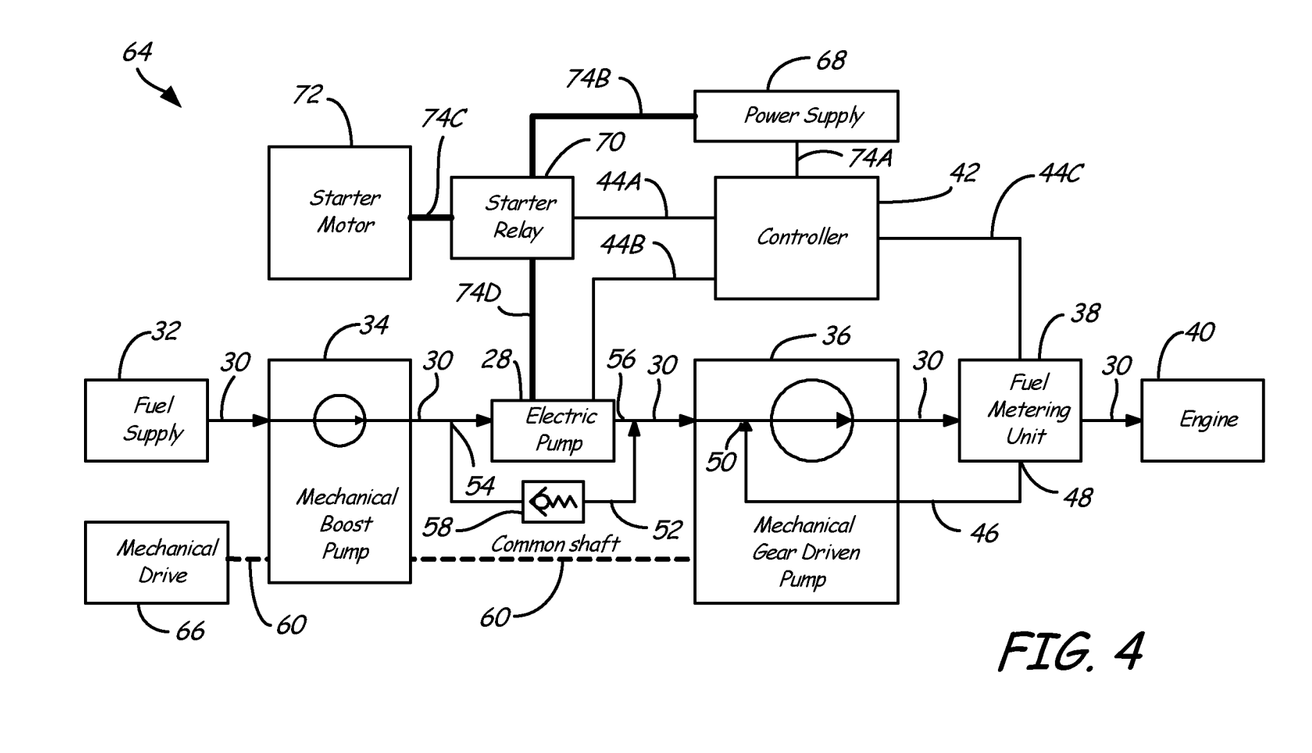
FIG. 4 is a schematic diagram showing a mechanical drive and power supply for fuel systems in accordance with the present disclosure.

FIG. 4 is a schematic diagram of fuel system 64 having mechanical drive 66 and power supply 68 for an APU. Fuel system 64 includes electric fuel pump 28, fuel supply conduit 30, fuel supply 32, mechanical boost fuel pump 34, mechanical gear-driven fuel pump 36, fuel metering unit 38, engine 40, controller 42, electrical connections 44A-44C, recirculation fuel conduit 46 having inlet 48 and outlet 50, bypass fuel conduit 52 having inlet 54 and outlet 56, bypass check valve 58, rotational shaft 60, mechanical drive 66, power supply 68, starter relay 70, starter motor 72, and power connections 74A-74D. Fuel system 64 is presented in a simplified form and can additionally include filters, heat exchangers, and/or other conventional components known in the art. Inclusion of electric fuel pump 28 allows fuel system 64 to provide fuel flow independent of engine 40 operating speed.

Fuel system 64 of FIG. 4 is similar to fuel system 62 of FIG. 3 and like numerals indicate like components. The components (e.g. electric fuel pump 28, fuel supply conduit 30, fuel supply 32, mechanical boost fuel pump 34, mechanical gear-driven fuel pump 36, fuel metering unit 38, engine 40, controller 42, electrical connections 44, fuel recirculation conduit 46 having inlet 48 and outlet 50, fuel bypass conduit 52 having inlet 54 and outlet 56, bypass check valve 58, rotational shaft 60) and structure of fuel system 64 of FIG. 4 are similar to those described above with reference to fuel system 62 of FIG. 3. Fuel system 64 of FIG. 4 differs from fuel system 62 of FIG. 3 in that mechanical drive 66 and power supply 68 are illustrated to describe a method of operating fuel system 64. The following discussion highlights mechanical and electrical operation of fuel system 64 of FIG. 4, which is applicable to any fuel system having both mechanical and electric fuel pumps (such as fuel system 62 of FIG. 3 and fuel system 26 of FIG. 2).

In fuel system 64, fuel supply conduit 30 fluidly connects fuel supply 32 to a combustor in engine 40. More specifically, fuel supply conduit 30 connects fuel supply 32, mechanical boost fuel pump 34, electric fuel pump 28, mechanical gear-driven fuel pump 36, fuel metering unit 38, and engine 40 in flow series. Along fuel supply conduit 30, fuel metering unit 38 is located upstream of engine 40, mechanical gear-driven fuel pump 36 is located upstream of fuel metering unit 38, electric fuel pump 28 is located upstream of mechanical gear-driven fuel pump 36, mechanical boost fuel pump 34 is located upstream of electric fuel pump 28, and fuel supply 32 is located upstream of mechanical boost fuel pump 34.

Fuel recirculation conduit 46 fluidly connects fuel metering unit 38 to fuel supply conduit 30 near mechanical gear-driven fuel pump 36. More specifically, inlet 48 of fuel recirculation conduit 46 is connected to fuel metering unit 38 and outlet 50 of fuel recirculation conduit 46 is connected to fuel supply conduit 30 at a location downstream of electric fuel pump 28 and a location upstream of mechanical gear-driven fuel pump 36. Fuel bypass conduit 52 fluidly connects fuel supply conduit 30 upstream of electric fuel pump 28 to fuel supply conduit 30 downstream of electric fuel pump 28. More specifically, inlet 54 of fuel bypass conduit 52 is connected to fuel supply conduit 30 at a location downstream of fuel supply 32 and a location upstream of electric pump, and outlet 56 of fuel bypass conduit 52 is connected to fuel supply conduit 30 at a location downstream of electric fuel pump 28 and a location upstream of mechanical boost fuel pump 34. Bypass check valve 58 is located on bypass fuel conduit 52.

Mechanical drive 66 is connected to mechanical boost fuel pump 34 and mechanical gear-driven pump 36 by common rotational shaft 60. Controller 42 is connected to starter relay 70 by first electrical connection 44A, to electric fuel pump 28 by second electrical connection 44B, and to fuel metering unit 38 by third electrical connection 44C. Power supply 68 is connected to controller 42 by first power connection 74A, and to starter relay 70 by second power connection 74B. Starter relay 70 is connected to starter motor 72 by third power connection 74C, and to electric pump 28 by fourth power connection 74D.

To begin operation of an APU, power supply 68 is switched on to energize controller 42 via first power connection 74A and starter relay 70 via second power connection 74B. Controller 42, now powered, sends a command to start the APU to starter relay 70 via first electrical connection 44A. Starter relay 70 either simultaneously, or in close succession, energizes starter motor 72 via third electrical connection 74C and electric fuel pump 28 via fourth electrical connection 74D. Accordingly, starter motor 72 starts rotation of engine 40 at or near a same time that electric fuel pump 28 begins pumping fuel along fuel supply conduit 30. Fuel is more or less instantaneously provided to fuel metering unit 38 a pressure and quantity sufficient to support combustor light off just as soon as engine 40 begins rotating. Based on desired operational speed for engine 40, controller 42 sends signals to fuel metering unit 38 via electrical connection 44C indicating the amount of fuel to flow along fuel supply conduit 30 to engine 40.

Electric fuel pump 28 can be driven by any suitable motor including, but not limited to, brushed DC, brushless DC, switch reluctance, coreless DC, synchronous AC, induction AC or any other type of electric motor. If electric fuel pump 28 is attached to a variable speed motor, then controller 42 can control speed of that motor and accordingly fuel output of electric fuel pump 28 via electrical connection 44B. In alternative embodiments, electric fuel pump 28 is commanded directly by controller 42 through electrical connection 44B and independently of starter motor 72.

Once energized, starter motor 72 begins rotating engine 40 including mechanical drive 66 (e.g. gear-box driven). Mechanical drive 66 operates mechanical boost fuel pump 34 and mechanical gear-driven pump 36 via shaft 60 at a speed proportion to engine 40 speed. Once engine 40 reaches about 50% of max engine speed, its operations become self-sustaining (i.e. mechanical boost fuel pump 34 and mechanical gearbox driven fuel pump 36 provide sufficient fuel flow and starter motor 72 is no longer needed to assist rotation). At the point engine 40 becomes self-sustaining, controller 42 commands starter relay 70 to cease operation of starter motor 72 and electric fuel pump 28 via first electrical connection 44A. Starter relay 70 then de-energizes both starter motor 72 via third power connection 74C and electric fuel pump 28 via fourth power connection 74D simultaneously or in quick succession. Through use of starter relay 70, controller 42 activates electric fuel pump 28 and starter motor 72 for engine starting and deactivates starter motor 72 and electric fuel pump 28 once they are no longer needed. The configuration depicted in FIG. 4 requires little in the way of additional hardware or software and can be retrofitted into existing APU fuel systems.

Figure 5:
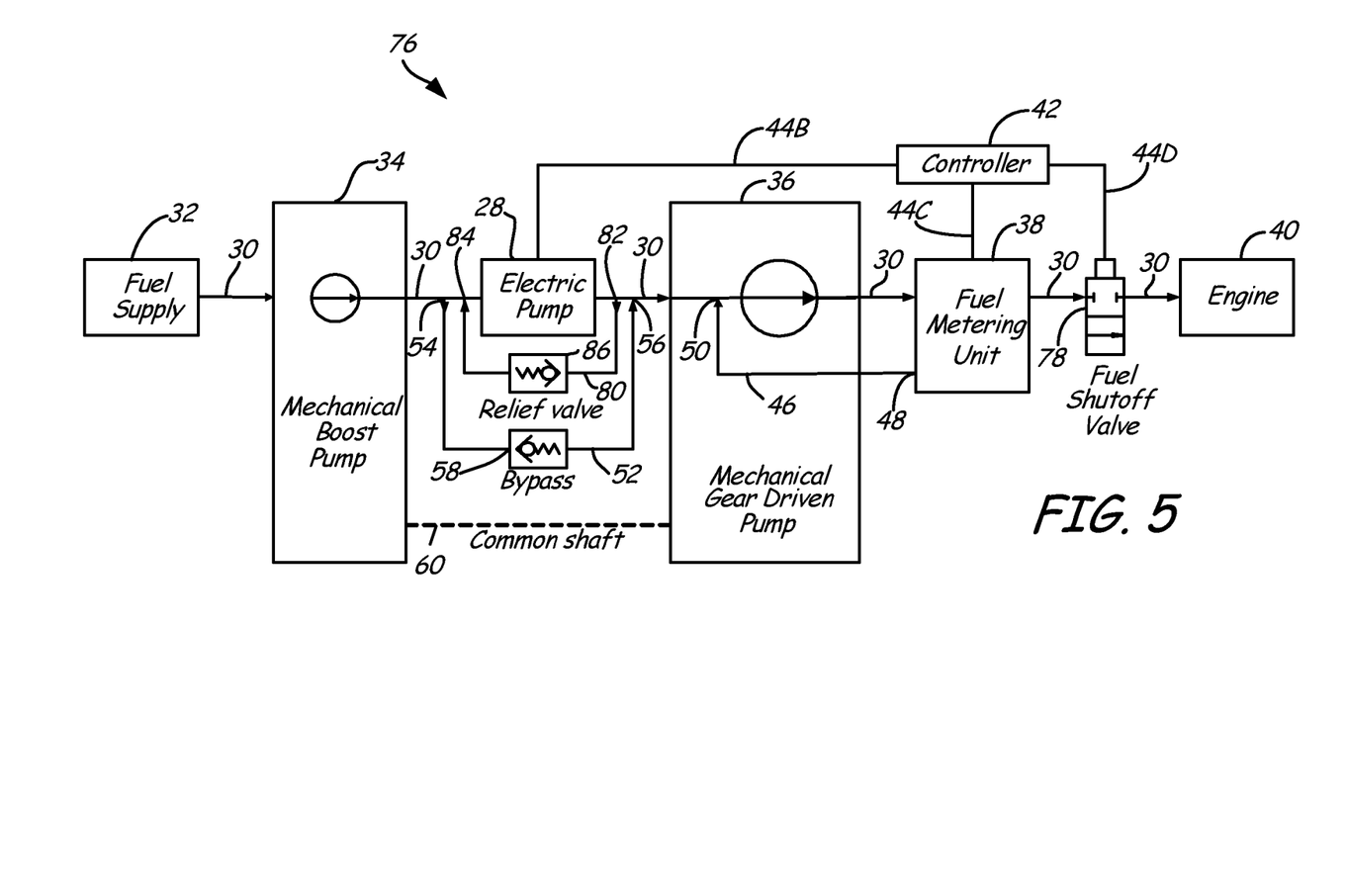
FIG. 5 is a schematic diagram showing a shut-off valve and relief fuel conduit for fuel systems in accordance with the present disclosure.

FIG. 5 is a schematic diagram of fuel system 76 having shut-off valve 78 and relief fuel conduit 80 for an APU. Fuel system 76 includes electric fuel pump 28, fuel supply conduit 30, fuel supply 32, mechanical boost fuel pump 34, mechanical gear-driven fuel pump 36, fuel metering unit 38, engine 40, controller 42, electrical connections 44B-44D, fuel recirculation conduit 46 having inlet 48 and outlet 50, fuel bypass conduit 52 having inlet 54 and outlet 56, bypass check valve 58, rotational shaft 60, fuel shut-off valve 78, relief fuel conduit 80 having inlet 82 and outlet 84, and relief check valve 86. Fuel system 76 is presented in a simplified form and can additionally include filters, heat exchangers, and/or other conventional components known in the art. Inclusion of electric fuel pump 28 allows fuel system 76 to provide fuel flow independent of engine 40 operating speed.

Fuel system 76 of FIG. 5 is similar to fuel system 62 of FIG. 3 and like numerals indicate like components. The components (e.g. electric fuel pump 28, fuel supply conduit 30, fuel supply 32, mechanical boost fuel pump 34, mechanical gear-driven fuel pump 36, fuel metering unit 38, engine 40, controller 42, electrical connections 44, fuel recirculation conduit 46 having inlet 48 and outlet 50, fuel bypass conduit 52 having inlet 54 and outlet 56, bypass check valve 58, rotational shaft 60) and structure of fuel system 76 of FIG. 5 are similar to those described above with reference to fuel system 62 of FIG. 3. Fuel system 76 of FIG. 5 differs from fuel system 62 of FIG. 3 in that fuel shut-off valve 78 and relief fuel conduit 80 are added to provide additional functionality. Despite the addition of shut-off valve 78 and relief fuel conduit 80, fuel system 76 of FIG. 5 can be operated in a manner similar to fuel system 62 of FIG. 3. The following discussion highlights the addition of shut-off valve 78 and relief fuel conduit 80 in the context of fuel system 76 of FIG. 5, but is applicable to any fuel system having both mechanical and electric fuel pumps (such as fuel system 64 of FIG. 4, fuel system 62 of FIG. 3, and fuel system 26 of FIG. 2).

In fuel system 76, fuel supply conduit 30 fluidly connects fuel supply 32 to a combustor of an engine 40. More specifically, fuel supply conduit 30 connects fuel supply 32, mechanical boost fuel pump 34, electric fuel pump 28, mechanical gear-driven fuel pump 36, fuel metering unit 38, fuel shut-off valve 78, and engine 40 in flow series. Along fuel supply conduit 30, fuel shut-off valve 78 is located upstream engine 40, fuel metering unit 38 is located upstream of fuel shut-off valve 78, mechanical gear-driven fuel pump 36 is located upstream of fuel metering unit 38, electric fuel pump 28 is located upstream of mechanical gear-driven fuel pump 36, mechanical boost fuel pump 34 is located upstream of electric fuel pump 28, and fuel supply 32 is located upstream of mechanical boost fuel pump 34. Controller 42 is electrically connected to electric fuel pump 28 by electrical connection 44B, to fuel metering unit 38 by electrical connection 44C, and to fuel shut-off valve 78 by electrical connection 44D.

Fuel recirculation conduit 46 fluidly connects fuel metering unit 38 to fuel supply conduit 30 at or near mechanical gear-driven fuel pump 36. More specifically, inlet 48 of fuel recirculation conduit 46 is connected to fuel metering unit 38, and outlet 50 of fuel recirculation conduit 46 is connected to fuel supply conduit 30 at a location downstream of electric fuel pump 28 and a location upstream of mechanical gear-driven fuel pump 36. Fuel bypass conduit 52 fluidly connects fuel supply conduit 30 upstream of electric fuel pump 28 to fuel supply conduit 30 downstream of electric fuel pump 28. More specifically, inlet 54 of fuel bypass conduit 52 is connected to fuel supply conduit 30 at a location downstream of fuel supply 32 and a location upstream of electric fuel pump 28, and outlet 56 of fuel bypass conduit 52 is connected to fuel supply conduit 30 at a location downstream of electric fuel pump 28 and a location upstream of mechanical gear-driven fuel pump 36. Bypass check valve 58 is located on bypass fuel conduit 52. Relief fuel conduit 80 fluidly connects fuel supply conduit 30 downstream of electric fuel pump 28 to fuel supply conduit 30 upstream of electric fuel pump 28. More specifically, inlet 82 of relief fuel conduit 80 is connected to fuel supply conduit 30 at a location downstream of electric fuel pump 28 and a location upstream of mechanical gear-driven fuel pump 36, and outlet 84 of relief fuel conduit 80 is connected to fuel supply conduit 30 at a location downstream of mechanical boost fuel pump 34 and a location upstream of electric fuel pump 28. Relief check valve 86 is located on relief fuel conduit 80. Rotational shaft 60 connects mechanical boost fuel pump 34 to mechanical gear-driven fuel pump 36.

To warm fuel prior to engine 40 starting, controller 42 commands fuel shut-off valve 78 to close and prevent fuel from flowing to engine 40. Controller 42 also commands electric pump 28 to operate and pump fuel along fuel supply conduit 30. Fuel flows from fuel pump 28 into inlet 82 of relief fuel conduit 80. Fuel flow continues along relief fuel conduit 80, through open relief check valve 86 and outlet 84 of relief fuel conduit 80 back into fuel supply conduit 30. In other words, fuel is recirculated from an outlet of electric fuel pump 28 back to an inlet of electric fuel pump 28. Relief check valve 86 is remains closed when a pressure differential across electric pump 28 is relatively low, and opens if the pressure differential across electric pump 28 reaches a predetermine set point. Sending fuel along relief fuel conduit 80 and back through electric fuel pump 28 can be implemented to add desirable heat into fuel system 76. This pre-warming of fuel is particularly beneficial during cold engine 40 starting. After a certain amount of time or once the fuel reaches a certain temperature, controller 42 will command fuel shut-off valve 78 to open and allow fuel to flow into engine 40. At or around the same time, a starter motor begins to rotate engine 40. At or around the same time, relief check valve 86 closes and no longer allows fuel to flow through relief fuel conduit 80, such that fuel continues from electric fuel pump 28 through mechanical gear-driven pump 36, fuel metering unit 38, and fuel shutoff valve 78 to engine 40.

With fuel shut-off valve 78 open, fuel flows from fuel supply 32 along fuel supply conduit 30 to engine 40. Once engine 40 begins rotating, mechanical boost fuel pump 34 and mechanical gear-driven fuel pump 36 join electric fuel pump 28 in pumping fuel along fuel supply conduit 30. As described above, mechanical boost fuel pump 34 and mechanical gear-driven fuel pump 36 are inefficient at low engine operating speeds, and electric fuel pump 28 supplements fuel output to fuel metering unit 38. Fuel metering unit 38 receives a signal from controller 42 through electrical connection 44C that indicates proper fuel flow to engine 40 based on operational need. Fuel metering unit 38 responds to the command from controller 42 by providing the proper fuel flow to engine 40 via fuel supply conduit 30 and through open fuel shut-off valve 78. Fuel metering unit 38 can include a fuel metering valve, a delta pressure valve, and/or a solenoid valve as known in the art. Fuel in excess of the amount required by engine 40 is sent from fuel metering unit 38 back to fuel supply conduit 30 along fuel recirculation conduit 46. More specifically, excess fuel exits fuel metering unit 38, flows through inlet 48 of fuel recirculation conduit 46 to outlet 50 and back into fuel supply conduit 30 at a location downstream of electric fuel pump 28 and upstream of mechanical gear-driven fuel pump 36.

Fuel flow output of both mechanical boost fuel pump 34 and mechanical gear-driven fuel pump 36 is dependent upon and proportional to the operating speed of engine 40. Accordingly, mechanical boost fuel pump 34 and mechanical gear-driven fuel pump 36 are inefficient at low speeds and increasingly efficient as engine 40 speed increases. At low engine operating speed, controller 42 commands electric fuel pump 28 to operate and supplement the inefficient pumping of mechanical boost fuel pump 34 and mechanical gear-driven fuel pump 36. Since electric fuel pump 28 is driven independently of engine 40 (e.g. by a motor), fuel flow output of sufficient pressure and quantity is immediately available for engine 40 at a lower engine speed than would be otherwise possible without assist. Once engine 40 reaches about 50% of max speed, mechanical boost fuel pump 34 and mechanical gear-driven fuel pump 36 provide more than enough fuel flow for the needs of engine 40 (i.e. engine is self-sustaining). Controller 42 then commands electric fuel pump 28 to cease operation, thereby extending the life of electric fuel pump 28 and saving energy. At or around the same time, bypass check valve 58 on bypass fuel conduit 52 will change from a closed state to an open state, thereby allowing fuel to flow along bypass fuel conduit 52. Note fuel flow along bypass fuel conduit 52 is counter to previous fuel flow along relief fuel conduit 80.

In the depicted embodiment, bypass check valve 58 is a passive pressure valve that remains closed when the pressure differential across bypass check valve 58 is positive, (pressure in conduit 52 is greater than in conduit 54) and opens when a pressure differential across bypass check valve 58 is negative, (pressure in conduit 52 is less than in conduit 54) (e.g. when electric pump 28 is turned off and not providing assist). When the pressure differential across bypass check valve 58 causes bypass check valve 58 to open, fuel will flow from mechanical boost fuel pump 34 along fuel supply conduit 30 to inlet 54 of bypass fuel conduit 52, through bypass check valve 58, to outlet 56 of bypass fuel conduit 52, and back into fuel supply conduit 30 at a location downstream of electric fuel pump 28 and upstream of mechanical gear-driven fuel pump 36. In other words, fuel will bypass electric pump 28 when bypass check valve 58 is open. In another embodiment, fuel flows along bypass fuel conduit 52 once electric fuel pump 28 is turned off and/or when fuel flow exceeds a flow capacity of the electric fuel pump 28. Fuel system 76 provides electric fuel pump 28 for supplementing fuel flow during low speed operation of engine 40. When electric fuel pump 28 is no longer needed (i.e. higher speed operation of engine 40), fuel bypasses electric fuel pump 28 and is pumped solely by mechanical boost fuel pump 34 and mechanical gear-driven pump 36.

The fuel systems described above provide one or more of the following benefits. The electric pump provides almost instantaneous fuel flow and pressure for the combustor use at very low engine speed. The weight and size of the mechanical pump(s) can be reduced because the typical over-sizing for starting operation is rendered unnecessary by inclusion of the electric fuel pump. Power needed for the fuel system is reduced because the pumps are smaller. A reduction in power use results in better fuel economy. Since mechanical pump size is reduced, excess fuel is reduced thereby resulting in less fuel recirculation and less waste heat in the fuel system. Less waste heat in the system means that the pumps run cooler and are more able to avoid cavitation. Fuel system can be configured to operate an electric pump and recirculate fuel prior to starting thereby warming fuel.

Figure 6:
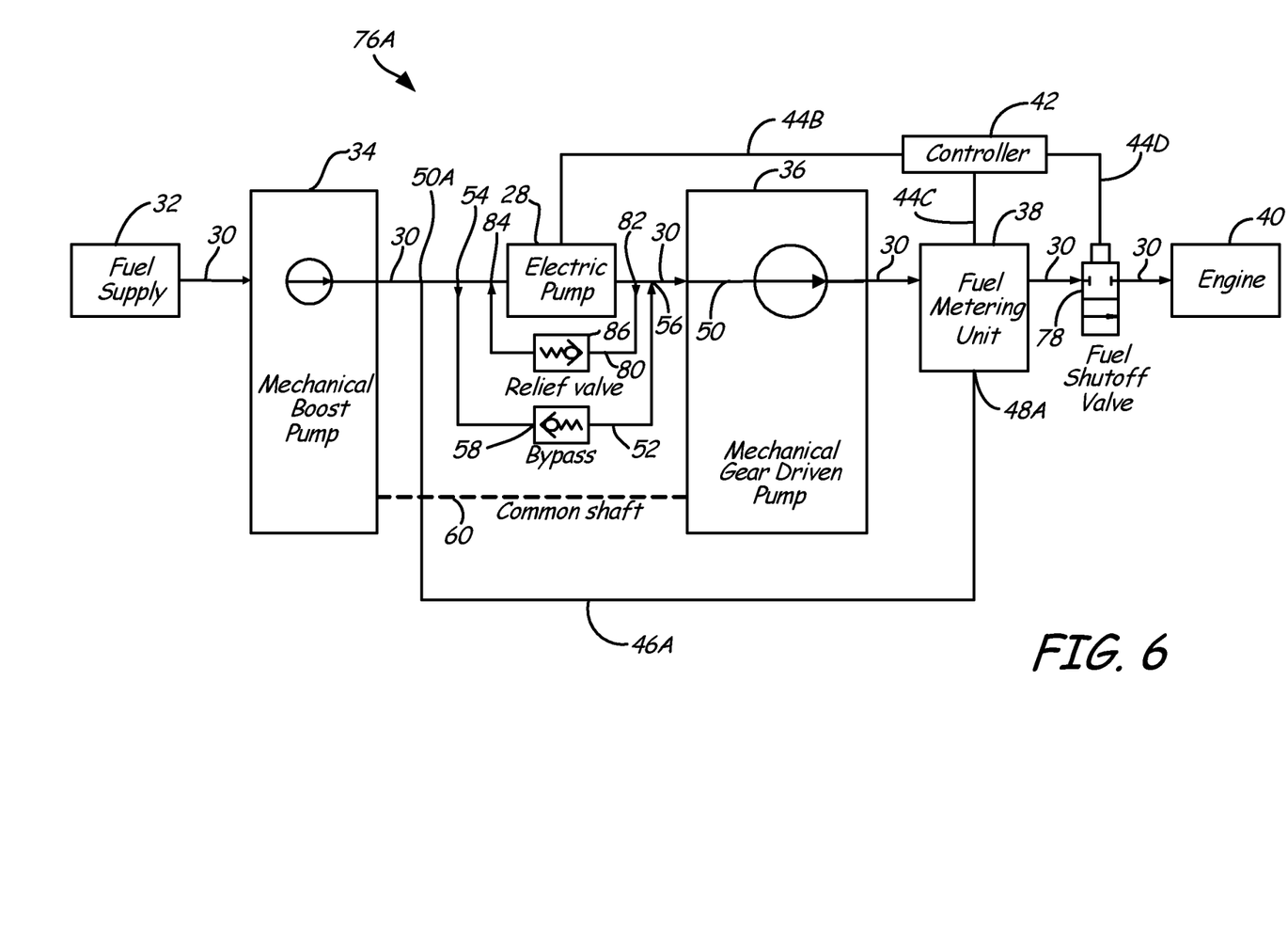
FIG. 6 is a schematic diagram showing a second embodiment of a fuel supply system with showing a shut-off valve and relief fuel conduit for fuel systems in accordance with the present disclosure.

FIG. 6 is a schematic diagram of a second embodiment of a fuel system 76A having electric fuel pump 28 for an APU. Fuel system 76A includes electric fuel pump 28, fuel supply conduit 30, fuel supply 32, mechanical boost fuel pump 34, mechanical gear-driven fuel pump 36, fuel metering unit 38, engine 40, controller 42, electrical connections 44B-44D, fuel recirculation conduit 46A having inlet 48A and outlet 50A, fuel bypass conduit 52 having inlet 54 and outlet 56, bypass check valve 58, rotational shaft 60, fuel shut-off valve 78, relief fuel conduit 80 having inlet 82 and outlet 84, and relief check valve 86. Fuel system 76A is presented in a simplified form and can additionally include filters, heat exchangers, and/or other conventional components known in the art. Inclusion of electric fuel pump 28 allows fuel system 76A to provide pre-heated fuel flow to engine 20 for ignition and start up.

FIG. 6 focuses on utilizing electric fuel pump 28 to pre-heat fuel flow to engine 20 for ignition and start up. In fuel system 76A, fuel supply conduit 30 fluidly connects fuel supply 32 to a combustor of an engine 40. More specifically, fuel supply conduit 30 connects fuel supply 32, mechanical boost fuel pump 34, electric fuel pump 28, mechanical gear-driven fuel pump 36, fuel metering unit 38, fuel shut-off valve 78, and engine 40 in flow series. Along fuel supply conduit 30, fuel shut-off valve 78 is located upstream engine 40, fuel metering unit 38 is located upstream of fuel shut-off valve 78, mechanical gear-driven fuel pump 36 is located upstream of fuel metering unit 38, electric fuel pump 28 is located upstream of mechanical gear-driven fuel pump 36, mechanical boost fuel pump 34 is located upstream of electric fuel pump 28, and fuel supply 32 is located upstream of mechanical boost fuel pump 34. Controller 42 is electrically connected to electric fuel pump 28 by electrical connection 44B, to fuel metering unit 38 by electrical connection 44C, and to fuel shut-off valve 78 by electrical connection 44D.

Fuel recirculation conduit 46A fluidly connects fuel metering unit 38 to fuel supply conduit 30 at or upstream of electrical pump 28. More specifically, inlet 48A of fuel recirculation conduit 46A is connected to fuel metering unit 38, and outlet 50A of fuel recirculation conduit 46A is connected to fuel supply conduit 30 at a location upstream of electric fuel pump 28 and a location upstream of mechanical gear-driven fuel pump 36.

Fuel bypass conduit 52 fluidly connects fuel supply conduit 30 upstream of electric fuel pump 28 to fuel supply conduit 30 downstream of electric fuel pump 28. More specifically, inlet 54 of fuel bypass conduit 52 is connected to fuel supply conduit 30 at a location downstream of fuel supply 32 and a location upstream of electric fuel pump 28, and outlet 56 of fuel bypass conduit 52 is connected to fuel supply conduit 30 at a location downstream of electric fuel pump 28 and a location upstream of mechanical gear-driven fuel pump 36.

Bypass check valve 58 is located on bypass fuel conduit 52. Relief fuel conduit 80 fluidly connects fuel supply conduit 30 downstream of electric fuel pump 28 to fuel supply conduit 30 upstream of electric fuel pump 28. More specifically, inlet 82 of relief fuel conduit 80 is connected to fuel supply conduit 30 at a location downstream of electric fuel pump 28 and a location upstream of mechanical gear-driven fuel pump 36, and outlet 84 of relief fuel conduit 80 is connected to fuel supply conduit 30 at a location downstream of mechanical boost fuel pump 34 and a location upstream of electric fuel pump 28. Relief check valve 86 is located on relief fuel conduit 80. Rotational shaft 60 connects mechanical boost fuel pump 34 to mechanical gear-driven fuel pump 36.

To warm fuel prior to engine 40 starting, controller 42 commands fuel shut-off valve 78 to close and prevent fuel from flowing to engine 40. Controller 42 also commands electric pump 28 to operate and pump fuel along fuel supply conduit 30. Fuel flows from fuel pump 28 into inlet 82 of relief fuel conduit 80. Fuel flow continues along relief fuel conduit 80, through open relief check valve 86 and outlet 84 of relief fuel conduit 80 back into fuel supply conduit 30. In other words, fuel is recirculated from an outlet of electric fuel pump 28 back to an inlet of electric fuel pump 28. Relief check valve 86 is remains closed when a pressure differential across electric pump 28 is relatively low, and opens if the pressure differential across electric pump 28 reaches a pre-determine set point. Sending fuel along relief fuel conduit 80 and back through electric fuel pump 28 can be implemented to add desirable heat into fuel system 76A. This pre-warming of fuel is particularly beneficial during cold engine 40 starting. After a certain amount of time or once the fuel reaches a certain temperature, controller 42 will command fuel shut-off valve 78 to open and allow fuel to flow into engine 40. At or around the same time, a starter motor begins to rotate engine 40. At or around the same time, relief check valve 86 closes and no longer allows fuel to flow through relief fuel conduit 80, such that fuel continues from electric fuel pump 28 through mechanical gear-driven pump 36, fuel metering unit 38, and fuel shutoff valve 78 to engine 40. Optionally, controller 42 can command electric fuel pump 28 to cease operation, thereby extending the life of electric fuel pump 28 and saving energy.

In the depicted embodiment, bypass check valve 58 is a passive pressure valve that remains closed when the pressure differential across bypass check valve 58 is positive, (pressure in conduit 52 is greater than in conduit 54) and opens when a pressure differential across bypass check valve 58 is negative, (pressure in conduit 52 is less than in conduit 54) (e.g. when electric pump 28 is turned off and not providing assist). When the pressure differential across bypass check valve 58 causes bypass check valve 58 to open, fuel will flow from mechanical boost fuel pump 34 along fuel supply conduit 30 to inlet 54 of bypass fuel conduit 52, through bypass check valve 58, to outlet 56 of bypass fuel conduit 52, and back into fuel supply conduit 30 at a location downstream of electric fuel pump 28 and upstream of mechanical gear-driven fuel pump 36. In other words, fuel will bypass electric pump 28 when bypass check valve 58 is open. In another embodiment, fuel flows along bypass fuel conduit 52 once electric fuel pump 28 is turned off and/or when fuel flow exceeds a flow capacity of the electric fuel pump 28.

The present disclosure improves the ability of fuel systems to deliver pre-warmed fuel in order to achieve a good quality fuel spray for fuel ignition during low speed engine starting. The electric motor-driven fuel pump in series with the mechanical gear-driven pump causes friction heating of fuel prior to engine start up. This pre-warmed fuel is then provided to the engine for ignition and start up. Pre-warmed fuel has reduced viscosity and surface tension. Thus, pre-warmed fuel is more capable of producing a desired fine spray even under cold starting conditions at altitude.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for an auxiliary power unit, the fuel system comprising:
   a mechanical fuel pump for providing fuel flow to the auxiliary power unit, the mechanical fuel pump having an output dependent upon an operational speed of the auxiliary power unit;
   an electric fuel pump located in series with the mechanical fuel pump, wherein the electric fuel pump is located upstream of the mechanical fuel pump on a common fuel supply conduit, wherein the electric fuel pump is driven independently of the operational speed of the auxiliary power unit;
   a relief fuel conduit having a first end and a second end, the first end fluidly connected to the fuel supply conduit downstream of the electric fuel pump and the second end fluidly connected to the fuel supply conduit upstream of the electric fuel pump;
   a relief check valve located on the relief fuel conduit, the check valve having an open configuration for allowing fuel to flow from the first end to the second end of the relief fuel conduit; and
   a controller configured to cause the electric fuel pump to circulate fuel from the first end to the second end of the relief fuel circuit prior to start-up of the auxiliary power unit.

2. The fuel system of claim 1, further comprising:
   a bypass conduit having a first end and a second end, the first end fluidly connected to the fuel supply conduit upstream of the electric fuel pump and the second end fluidly connected to the fuel supply conduit downstream of the electric fuel pump; and
   a bypass check valve located on the bypass conduit, the check valve having an open configuration for allowing fuel to flow from the first end to the second end of the bypass conduit.

3. The fuel system of claim 2, further comprising:
   a fuel metering unit for managing the fuel flow to the auxiliary power unit, the fuel metering unit located downstream of both the electric fuel pump and the mechanical fuel pump on the fuel supply conduit; and
   a recirculation conduit having a first end and a second end, the first end connected to the fuel metering unit and the second end connected to the fuel supply conduit at a location downstream of the electric fuel pump.

4. The fuel system of claim 1, further comprising:
   a fuel metering unit for managing the fuel flow to the auxiliary power unit, the fuel metering unit located downstream of both the electric fuel pump and the mechanical fuel pump on the fuel supply conduit; and
   a recirculation conduit having a first end and a second end, the first end connected to the fuel metering unit and the second end connected to the fuel supply conduit at a location upstream of the electric fuel pump.

5. The fuel system of claim 1, further comprising:
a boost fuel pump for increasing fuel flow to the auxiliary power unit, the boost fuel pump located on the fuel supply conduit upstream of the mechanical fuel pump.

6. The fuel system of claim 5, wherein the electric fuel pump is located upstream of the boost fuel pump.

7. The fuel system of claim 5, wherein electric fuel pump is located downstream of the boost fuel pump.

8. The fuel system of claim 1, wherein the controller shuts the electric fuel pump off at a higher operational speed for the auxiliary power unit.

9. The fuel system of claim 8, wherein the electric fuel pump is operated from 1% to 8% of a maximum engine speed.

10. A fuel system for an auxiliary power unit, the fuel system comprising:
a fuel supply conduit fluidly connecting a fuel reservoir to a combustor;
a fuel metering unit located on the fuel supply conduit upstream of the combustor;
a mechanical gear driven pump located on the fuel supply conduit upstream of the fuel metering unit;
a mechanical boost pump located on the fuel supply conduit upstream of the mechanical gear driven pump;
an electric fuel pump located on the fuel supply conduit upstream of the mechanical gear driven pump, wherein the electric fuel pump is driven independently of an operational speed of the auxiliary power unit;
a fuel shut-off valve located on the fuel supply conduit between the fuel metering unit and the combustor, the fuel shut-off valve having an open configuration and a closed configuration;
a relief fuel conduit fluidly connecting an outlet of the electric fuel pump to an inlet of the electric fuel pump, wherein fuel flows along the relief fuel conduit when the fuel shut-off valve is in the closed configuration; and
a controller configured to command the electric fuel pump to circulate fuel through the relief fuel conduit prior to start-up of the auxiliary power unit.

11. The fuel system of claim 10, further comprising:
a starter motor, wherein the controller is configured to command the starter motor to start rotation of the auxiliary power unit after fuel is heated from flowing along the relief fuel conduit.

12. The fuel system of claim 10, wherein the controller shuts the electric fuel pump off at a higher operational speed for the auxiliary power unit.

13. The fuel system of claim 10, wherein the electric fuel pump is operated from 1% to 8% of a maximum engine speed.

14. A method for providing warmed fuel to an auxiliary power unit, the method comprising:
providing a fuel reservoir fluidly connected to a combustor of the auxiliary power unit by a fuel supply conduit;
providing a mechanical boost pump, a mechanical gear-driven pump, a fuel metering unit, and a shut-off valve disposed along the fuel supply conduit in flow series;
commanding the shut-off valve to close and prevent fuel from flowing to the auxiliary power unit, wherein the shut-off valve has an open configuration and a closed configuration;
using a controller to provide power to an electric pump and to cause the electric pump to circulate and thereby warm fuel prior to start-up of the auxiliary power unit, wherein the electric pump is located along the fuel supply conduit upstream from the mechanical gear pump and is driven independently of an operational speed of the auxiliary power unit, and wherein fuel circulates along a relief conduit fluidly connecting an outlet to an inlet of the electric pump; and
commanding the shut-off valve to open and allow fuel to flow into the auxiliary power unit.

15. The method of claim 14, further comprising:
terminating power to the electric pump when the output of a mechanical pump provides sufficient fuel flow to sustain operation of the auxiliary power unit.

16. The method of claim 15, wherein the electric fuel pump is operated from about 1% to 8% of a maximum engine speed.

17. The method of claim 14, wherein the shut-off valve is commanded to open to allow the preheated fuel to the auxiliary power unit either after a predetermined period of time or the fuel reaches a desired temperature.

* * * * *